United States Patent
Helzner

[15] 3,691,245
[45] Sept. 12, 1972

[54] PRODUCTION OF ETHYLBENZENE
[72] Inventor: Albert E. Helzner, Marblehead, Mass.
[73] Assignee: The Badger Company, Inc., Cambridge, Mass.
[22] Filed: Sept. 18, 1970
[21] Appl. No.: 73,341

[52] U.S. Cl. ............................................260/671 R
[51] Int. Cl. ...............................................C07c 3/52
[58] Field of Search ..................................260/671 R

[56] References Cited

UNITED STATES PATENTS 3,255,269  6/1966  Gilman et al. ..............260/671

Primary Examiner—Curtis R. Davis
Attorney—Sol B. Wiczer

[57] ABSTRACT

Benzene is efficiently recovered and the alkylating process is made to run more efficiently to produce ethylbenzene in the process of alkylating benzene with dilute ethylene by recirculating a large volume of polyethylbenzene to efficiently recover the benzene in the off-gases, splitting the benzene-rich polyethylbenzene scrubber effluent, returning a small approximate reaction equilibrium quantity of polyethylbenzene to the reactor, and then processing both the remaining benzene-rich scrubber effluent together with the total reactor effluent to recover benzene, ethylbenzene and residual polyethylbenzene.

5 Claims, 1 Drawing Figure

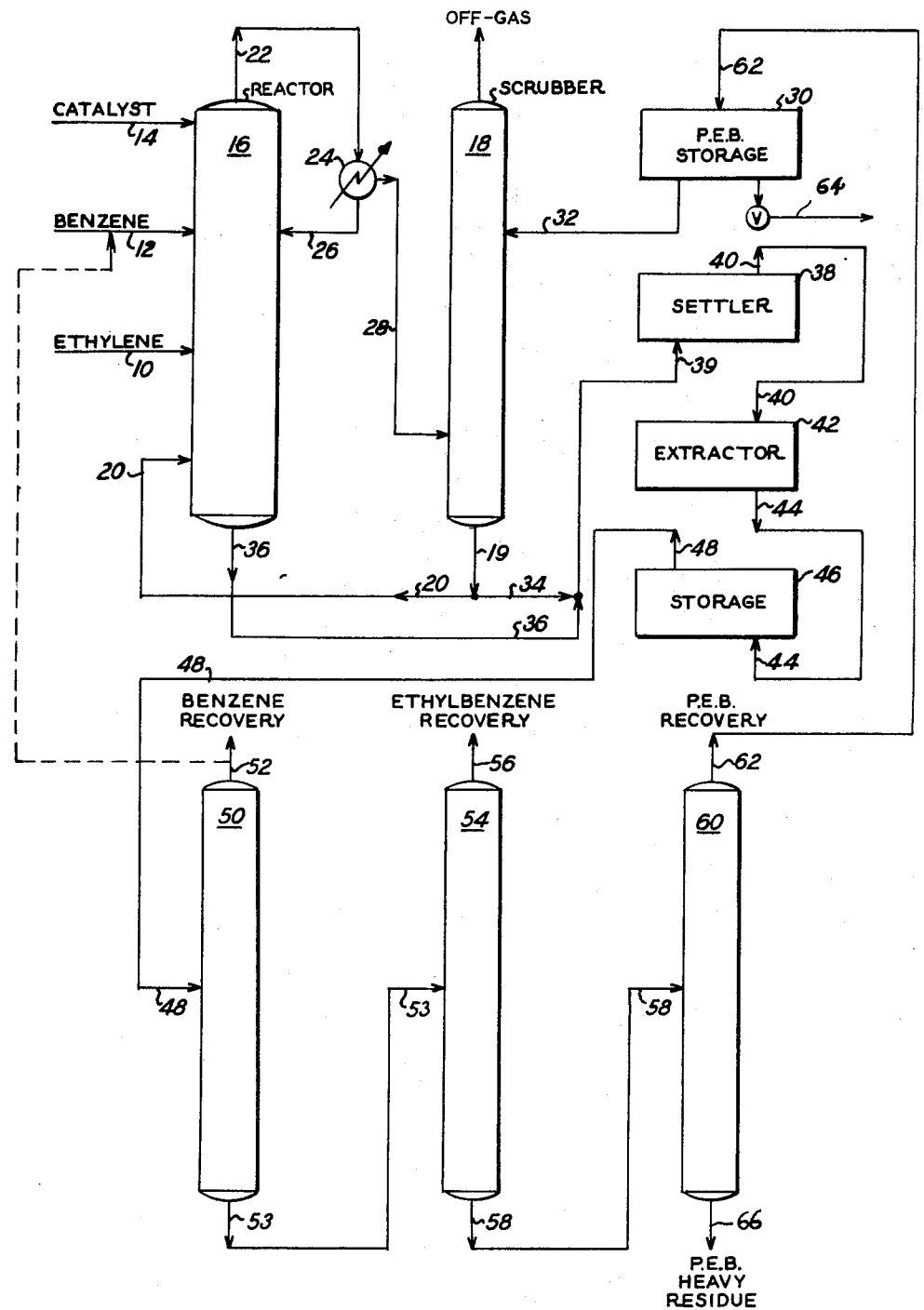

PRODUCTION OF ETHYLBENZENE

This invention relates to the improved production of ethylbenzene. More particularly, this invention relates to improved recovery of benzene from off-gases produced in ethylbenzene synthesis by alkylation of benzene with dilute ethylene-containing gases.

According to the present invention the benzene is economically recovered by large volume scrubbing of the off-gases with polyethylbenzene in a single scrubber to recover substantially all of the benzene. The benzene-rich polyethylbenzene from the scrubber is split into a recycle stream to the reactor to return an equilibrium-maintaining quantity of polyethylbenzene from the scrubber, and a polyethylbenzene recovery stream, the latter being preferably jointly processed with the reactor effluent to recover all of the liquid values.

In the production of ethylbenzene by catalytic reaction of benzene and ethylene in the presence of an alkylation catalyst, such as promoted Friedel-Crafts or the like, significant economy in the reaction has been found to be present in the use of dilute ethylene feeds usually containing less than 50 percent, and as low as 35 percent ethylene, and usually not more than 75 percent ethylene, the balance being largely inert gases such as ethane, methane and hydrogen. Such reaction is often carried out at increasingly high pressures and temperatures, variable somewhat with the catalyst in the range of about 125° to 300°F, and a pressure ranging from about atmospheric to about 100 psig.

This reaction mixture contains ethylbenzene reaction product and unreacted benzene as well as a smaller quantity of higher polyethylbenzenes and portions of the catalyst, all of the components of the reaction mixture being variable with the equilibrium conditions established by the temperature, pressure and catalyst.

When a relatively pure ethylene feed has been used in the reaction, the quantity of off-gases is usually small and the normal recycle requirement of polyethylbenzene back to the reactor has provided ample scrubbing fluid to recover the small quantity of unreacted benzene in the off-gas. However, the reaction has been generally inefficient using dilute ethylene feed in that the large volume of off-gases has carried an excessive quantity of unreacted benzene whose recovery has been attempted by scrubbing, usually in several scrubbers, with ethylbenzene and/or polyethylbenzene as scrubbing fluid, with all of the benzene-rich polyethylbenzene from the scrubbers being recycled to the reactor.

The recirculation of polyethylbenzene via the scrubber for reclaiming of the benzene has been inefficient largely because the equilibrium composition does not contain enough polyethylbenzene for efficient benzene recovery by a scrubbing of the off-gases therewith.

According to the present invention, a large volume scrubber feed is first made available in the storage tank, sufficient to allow large volume scrubbing of the off-gases in a single scrubber by independent circulation of the polyethylbenzene from storage, for efficient removal of benzene therefrom. The rich polyethylbenzene scrubber solution of recovered benzene is separated by splitting into two streams. The smaller quantity of benzene-rich recycle polyethylbenzene in quantity of about 5 to 35 percent is returned to the reactor. This stream is preferably adjusted in quantity to be only sufficient to maintain the normal equilibrium concentration of polyethylbenzene in the reactor variable, as stated, within such range with the particular reaction conditions and catalyst as maintained in the reactor. The larger volume stream of polyethylbenzene scrubber solution is reprocessed with the total reaction product effluent from the reactor to recover benzene independently as total recovered benzene, including that portion of the benzene which remained with the liquid reaction product and recovered by distilling for ultimate return to the reactor feed.

By this means only a single scrubber is needed to remove substantially all of the benzene contained in the off-gases, and only the equilibrium quantity of polyethylbenzene needed to maintain the reactor equilibrium is recycled to the reactor. The remaining polyethylbenzene accumulated in the storage is merely recirculated in large volume to the single scrubber for its efficient operation to recover substantially all of the unreacted benzene using a dilute ethylene alkylation feed.

Important economies are available in this procedure to recover all of the benzene in the off-gases in a single scrubber; to recirculate only a benzene-rich equilibrium quantity of polyethylbenzene to the reactor, increasing the reactor efficiency thereby; while providing a large enough quantity of polyethylbenzene for scrubbing purposes for efficient operation of the single scrubber. Since benzene remaining in the liquid reaction product is removed in a first distillation column for its recovery in any case, the compositing of total reactor effluent liquid passing thereto with the excess circulation quantity of scrubber liquid rich in benzene, for total benzene recovery from the combined liquids phase, only increases the quantity of benzene passing overhead and is not an extra step.

The invention is further described by reference to the single sheet of drawing which shows diagrammatically the processing arrangement of operating units.

As shown therein, dilute ethylene-containing gases in line 10, benzene in line 12, and catalyst through line 14, are simultaneously passed to the reactor 16. A recycle solution of benzene in polyethylbenzene from scrubber 18 is passed by way of lines 19 and 20 to the reactor 16, the recycle solution being one of a split scrubber effluent passing in quantity substantially to maintain the polyethylbenzene content at equilibrium, variable with the exact process, temperature and catalyst of reactor 16. Overhead off-gases comprising largely inert gases including some unreacted ethylene and benzene, together with some reactor acid, pass overhead by way of line 22 and are cooled in a cooler 24. The condensed liquids form cooler 24 are returned to reactor 16 by way of line 26, and the gases pass to the bottom of scrubber 18 by way of line 28.

A large scrubbing volume of polyethylbenzene is taken from storage tank 30 and passed by way of line 32 to the top of scrubber 18, countercurrent to the flow of off-gas therethrough to contact the off-gas with at least 10 parts of polyethylbenzene to 1 part of benzene-free off-gas by weight. More usually up to 50 parts of polyethylbenzene scrubbing liquid is passed through line 32 per unit weight of benzene-free off-gas, to form a benzene-rich polyethylbenzene solution which is withdrawn through line 19. The benzene-rich polyethylbenzene scrubber effluent is divided and, as stated above, an approximate equilibrium quantity is passed as a split stream through line 20 and recycled to the reactor 16. A second stream consisting of a recirculated volume of benzene-rich polyethylbenzene split from the scrubber effluent is continued in the system by way of line 34. The volume of polyethylbenzene solution of benzene in line 34 corresponds to the volume of polyethylbenzene withdrawn from storage tank 30 from line 32 less the equilibrium volume separated in line 20.

The reaction product liquid including catalyst, ethylbenzene, polyethylbenzene, unreacted benzene and other minor products present in said reaction product are withdrawn as reactor effluent from the bottom of reactor 16, and passed by way of line 36, joining the split recirculation stream of benzene-rich polyethylbenzene in line 34, both passing to a settling tank 38 by way of line 39. The catalyst, such as aluminum chloride, is separated by settling tank 38 and is recycled at least in part (not shown) to catalyst inlet feed line 14 to the reactor 16. The clear reaction liquid passes by way of line 40 to an extraction unit 42 in which the catalyst acid or promoter is separated by washing. The washed reaction product passes by line 44 to storage 46. The reaction liquid is then purified by distillation, passing by way of line 48 to a column 50 from which total unreacted benzene is withdrawn overhead through a line 52 and may be recycled to the reactor or passed to benzene storage (not shown). The heavier liquids of the reaction mixture are withdrawn at the bottom of column 50 through line 53 and passed to an ethylbenzene recovery column 54, the ethylbenzene being distilled overhead and removed through line 56, passing to ethylbenzene storage (not shown). The polyethylbenzenes are withdrawn from the bottom of column 54 through line 58 and sent to a polyethylbenzene column 60, the diethylbenzenes and possibly some triethylbenzenes passing overhead through line 62, passing thence to storage tank 30. A small quantity of excess polyethylbenzene may be withdrawn through line 64 from time to time after the storage tank 30 has been substantially filled.

In this manner all of the liquid benzenes as contained in the recirculated polyethylbenzene in line 34 as well as that withdrawn with the reaction mixture from the bottom of the reactor 16 is removed as distillate from the top of column 50. Only a single gas scrubber 18 is needed for efficient removal of all of the volatile benzenes passing overhead with the off-gases through lines 22 and 28 to the scrubber 18. The storage tank 30 is initially supplied from an outside source with enough polyethylbenzene for return through line 32 to the top of scrubber 18 for washing the off-gas in large volume ratio, sufficient to efficiently remove substantially all of the benzene from the off-gases. This large excess of polyethylbenzene is then recirculated to the system for recovery of the benzene in column 50 by way of line 34 after first separating an equilibrium quantity of polyethylbenzene for return to the reactor through line 20. Heavier polyethylbenzenes are withdrawn from the bottom of column 60 by way of line 66 and are thence withdrawn from the system.

The following example further illustrates the practice of this invention:

EXAMPLE I

In a typical installation, aluminum chloride promoted by hydrochloric acid as catalyst is passed to a reactor operated at a temperature of about 150°F, typically at a pressure of about 50 psig. A dilute ethylene feed comprising about 40 percent ethylene and the balance being substantially ethane with small quantities of methane and hydrogen together with an excess of benzene are simultaneously passed to the reactor. The overhead gases from the reactor are cooled to about 100°F and those gases still containing about 10 percent of benzene are passed to the bottom of the scrubber. Cold polyethylbenzene at a temperature of about 120°F is withdrawn from storage and is pumped to the top of the scrubber and is then sprayed countercurrently to the gas passing upwardly therethrough in sufficient volume to extract the benzene. About 10 pounds of polyethylbenzene per pound of benzene-free off-gas is employed, producing about a 0.5 percent benzene solution therein. The benzene solution is polyethylbenzene is divided in ratio of about 3 to 1, varied as required to meet the desired equilibrium composition of the reactor; the one volume flow passing through line 20 with a three volume flow through line 34.

The following material balance is typical:

| Line Stream | Composition | Flow Rate, LB/HR |
| --- | --- | --- |
| 20 Recycled PEB | PEB | 11,290 |
|  | Benzene | 50 |
|  | TOTAL | 11,340 |
| 34 Recirculated PEB | PEB | 33,870 |
|  | Benzene | 150 |
|  | TOTAL | 34,020 |
| 32 Scrubber Feed | PEB | 45,160 |
|  | Benzene | — |
|  | TOTAL | 45,160 |
| 36 Reactor Effluent PEB | PEB | 11,290 |
| 39 Total PEB Recovery | PEB | 45,160 |

At the start of the operation, the storage tank 30 is inventoried with polyethylbenzene from an external source to provide a supply of polyethylbenzene for other start-up operations. Scrubber feed is withdrawn from storage via line 32 and the recirculation stream from the scrubber is sent to the settler tank 38 via lines 19, 34 and 39. The polyethylbenzene is then processed through the extraction and distillation sections and returned to storage tank 30. The flow of recycle feed in line 20 in varied as desired to satisfy reactor start-up conditions. When normal operations obtain, the recycle feed in line 20 is increased to approximately that required for reactor equilibrium conditions so that the split of recycle feed to the reactor and the recirculation stream are so divided that about one-third of the scrubber effluent is recycled to the reactor and two-thirds to recovery.

It will be seen, consequently, that the single scrubber is efficiently operated with a large volume of polyethylbenzene scrubbing liquid, made possible by an initial inventory of a large enough quantity in storage to supply sufficient quantity to allow the large volume of liquid for scrubbing of the total off-gas. During normal reactor operation equilibrium conditions are controlled so that no polyethylbenzene is consumed or produced. That large volume of effluent from the scrubber is split to return only enough benzene-enriched polyethylbenzene to the reactor to maintain this equilibrium. While the polyethylbenzene can be redistilled to separate much heavier from intermediate polyethylbenzenes, the bottoms of the ethylbenzene still can be used without further purification as scrubber liquid.

Such other variations as known in the art of synthesis of ethylbenzenes may be applied here.

What is claimed is:

1. In a process for forming ethylbenzene by alkylating benzene in a catalytic reactor and recovering the reaction products including benzene from the off-gases, the steps of
    a. catalytically reacting a dilute ethylene gas with benzene in a reactor in the presence of a catalyst and about 5 to 35 percent of recycle polyethylbenzene based upon a total off-gas scrubber effluent;
    b. withdrawing liquid reaction product from the reactor and processing the same in a series of liquid recovery steps to recover benzene, monoethylbenzene and polyethylbenzene separately by distillation;
    c. passing the off-gas of said reaction containing benzene vapors from the reactor to a scrubber;
    d. passing a large wash volume of polyethyl-benzene to said scrubber to remove the benzene from said off-gases;
    e. splitting the recovered liquid benzene-rich scrubber effluent from said scrubbing step into two separate streams;
    f. passing one of said scrubber effluent streams in quantity of about 5 to 35 percent of said scrubber effluent as recycle to said reactor;
    g. passing the second scrubber effluent stream together with said liquid reaction product withdrawn from said reactor to said liquid recovery;
    and
    h. recirculating recovered polyethylbenzene to said scrubber.

2. The process as defined in claim 1 wherein the benzene-rich polyethylbenzene scrubber liquid effluent is divided into split streams, and the stream which is recycled to said reactor is in quantity approximating the equilibrium quantity of polyethylbenzene formed in the alkylation reaction.

3. The process as defined in claim 1 wherein at the start of said reaction polyethylbenzene is inventoried in storage in substantial quantity to supply a large work volume for scrubbing said off-gases, and after said inventory, the polyethylbenzene is then passed from storage to said off-gas scrubber in large volume, independently of the polyethylbenzene requirement of the reaction.

4. The process as defined in claim 1 wherein the benzene recovered is reused as a portion of the benzene feed to said reactor.

5. The process as defined in claim 1 wherein the dilute ethylene feed to said reactor is a refinery ethylene gas containing less than about 50 percent of ethylene, the remainder being inert refinery gases.

* * * * *